United States Patent [19]

Vincent

[11] Patent Number: 4,548,733

[45] Date of Patent: Oct. 22, 1985

[54] ANIONIC SILICONATES OF SILYLORGANOCARBOXYLATES, SULFONATES AND PHOSPHONATES TO REDUCE VISCOSITIES OF PARTICULATE SLURRIES

[75] Inventor: Harold L. Vincent, Midland, Mich.

[73] Assignee: Dow Corning Corporation, Midland, Mich.

[21] Appl. No.: 658,237

[22] Filed: Oct. 5, 1984

[51] Int. Cl.$^4$ ................................................ C08J 5/54
[52] U.S. Cl. ................................ 252/310; 106/308 Q; 106/308 S; 252/313.1
[58] Field of Search ................... 252/174.15, 311, 310, 252/313.1; 106/308 Q, 308 S

[56] References Cited

U.S. PATENT DOCUMENTS

| | | | |
|---|---|---|---|
| 3,265,623 | 8/1966 | Pines | 252/78.3 |
| 4,344,860 | 8/1982 | Plueddemann | 252/78.3 |
| 4,352,742 | 10/1982 | Davis | 252/78.1 |
| 4,370,255 | 1/1983 | Plueddemann | 252/78.3 |

*Primary Examiner*—Paul R. Michl
*Attorney, Agent, or Firm*—Robert L. McKellar

[57] ABSTRACT

What is disclosed is a method of reducing the viscosities of aqueous slurries of particulate materials using anionic siliconates of silylorganocarboxylates, sulfonates and phosphonates and the compositions that are obtained thereby. An example is the use of 0.1 weight percent of

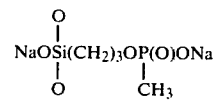

to lower the viscosity of a 60% solids slurry of TiO$_2$ from 2320 cps at 25° C. to 80 cps at 25° C.

112 Claims, No Drawings

ANIONIC SILICONATES OF SILYLORGANOCARBOXYLATES, SULFONATES AND PHOSPHONATES TO REDUCE VISCOSITIES OF PARTICULATE SLURRIES

BACKGROUND OF THE INVENTION

This invention deals with the reduction of viscosities of aqueous slurries of particulate materials and the uniform dispersion of particulate materials in aqueous systems.

It is generally known that particulate materials in aqueous slurries have a tendency to agglomerate while in the slurry and this causes the slurry to become thicker and in some cases solidify to the point where the slurry becomes a paste and is no longer pourable or pumpable. Generally, the finer the particulate materials, the greater is the tendency for them to agglomerate. Aside from the problems of high viscosity caused by such agglomeration, there are the problems of non-uniform coatings that can come about because the particulate material is not uniformly dispersed in the aqueous slurry.

Thus, it is advantageous to cause fine particulate materials to be uniformly dispersed in the aqueous slurry and one of the most common methods by which this uniform dispersion can be brought about is by simple stirring of the slurry. For those aqueous slurries that have agglomerated and whose particles are more reticent to disperse, one can use more severe means to redisperse them such as high shear mixing on suitable machinery.

More recently however it has been found advantageous to use dispersing agents to allow the particulate material to uniformly disperse in slurries and moreover, to allow the particulate material to remain dispersed, that is, non-agglomerating over long periods of time. Such materials are organic dispersants, for example, sodium polyacrylates sold as the Tamol ® line of products by the Polymers, Resins and Monomers Division of Rohm and Haas Co., Philadelphia, Pa. U.S.A. These materials have limitations however, in that they are not efficient on slurries whose solids content ranges over sixty weight percent.

Other dispersants commonly used for this application are inorganic polyanionic compounds such as tetrasodium pyrophosphate but these materials decompose during storage over long periods of time.

Yet another type of dispersing agent that has been suggested are the MS-VTS copolymers (Maleic acid anhydridevinylalkoxysilane copolymers) as disclosed in U.S. Pat. No. 4,267,093, issued May 12, 1981. These materials however are limited to their use with inorganic oxidic particulate materials and, their application is explained as being useful without increasing the viscosities of the suspensions obtained. Nothing is set forth in that patent to suggest that those materials actually reduce the viscosities of high viscosity, high solids content, aqueous slurries.

Further suggested materials are those found in Russian Pat. No. 907,000, published Feb. 23, 1982, and referenced in Author's Certificate USSR No. 561721 (1975), which are sodium and potassium salts of organosilicon ethers of sulfosuccinic acid having the general formula

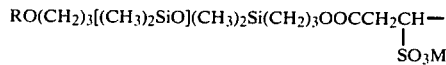
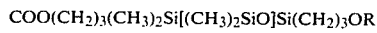

wherein R is hydrogen or $CH_3CO-$ and M is sodium or potassium. These compounds are described as being insoluble in organic solvents which limits their usefulness as surfactants. The Russian patent specification then discloses that other new compounds, similar to those just described, which are trialkylbenzylammonium salts of bis(1,1,3,3-tetramethyl-1-propyl-3-oxypropyldisiloxane)sulfosulfoxinates having the general formula

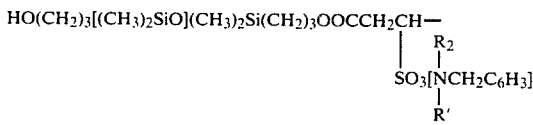

are also useful for lowering the viscosity of organosilicon compounds.

There is also disclosed in several patents, the use of various silanes to coat particulate materials. Such patents are for example U.S. Pat. No. 4,177,317, issued Dec. 4, 1979 and U.S. Pat. No. 4,316,807, issued Feb. 23, 1982. The former patent deals with the stabilization of chromium (IV) dioxide using silanes having the general formula $R_nSi(OR')_{4-n}$, n-butyltrimethoxysilane and isobutyl-trimethoxysilane are preferred. The process includes the treatment of the particulate material by suspending such particulate material in an alcoholic, aqueous-alcoholic or aqueous medium containing the hydrolyzable silane and subsequently drying the particulate material to obtain particles coated with the hydrolysis product of the silane. The claim is that these treated particles do not lose their valuable magnetic properties. The latter U.S. Pat. No. 4,316,807, deals with the treatment of particulate materials using higher alkyl containing hydrolyzable silanes. This treatment is intended to increase the viscosity of the aqueous particulate system.

In U.S. Pat. No. 4,369,265, there is shown the use of an organo-silicone polymer to coat finely divided solids, such as pigments, to make them readily dispersible. An example of an organo-silicone polymer useful therein is $(CH_3)_{0.67}(C_6H_5)_{1.0}Si(OC_{18}H_{37})_{0.71}(OCH_3)_{0.04}O_{0.79}$. The inventors claim that such a treatment coats the particles and gives good dispersion properties and high volume filling.

Another U.S. Pat. No. 4,404,318 deals with pigments, dispersing agents and organic dispersing mediums wherein the dispersing agents are, for example, the reaction product of an amino resin, an alkyd resin or an acrylic resin with a silane coupling agent wherein the silane coupling agents useful therein are described as those containing amino groups such as $NH_2(CH_2)_3Si(OC_2H_5)_3$; those containing a urea group such as gamma-ureidopropyltriethoxysilane; those containing a mercapto group such as $HS(CH_2)_3Si(OCH_3)_3$; those containing an epoxy group such as

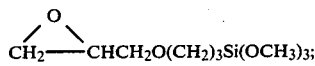

those containing haloalkyl groups such as Cl(CH$_2$)$_3$Si(OCH$_3$)$_3$; those containing ethylenically unsaturated double bonds such as vinyltrimethoxysilane, and mixtures thereof.

In addition, U.S. Pat. No. 4,427,824, discloses a method of dispersing fillers using hydrolyzable ester compounds such as trialkyl orthoformates, i.e., tributylorthoformate. The inventors claim that these systems are storage stable in that the pigments stay dispersed in silyl group containing compounds.

None of the prior art however deals with the additives of this invention and none of the prior art shows or makes obvious the use of such compounds in viscosity reduction and uniform dispersion of particulate material in aqueous systems.

There is a need therefore for a method of reducing the viscosities of, and causing uniform dispersibility of, particulate slurries using stable, efficient dispersing agents.

THE INVENTION

This invention therefore consists of a method for reducing the viscosities of slurries of particulate materials and the uniform dispersion of particulate materials in aqueous slurries as well as compositions comprising particulate material slurries and a reducent for such slurries.

Thus, one aspect of this invention is a method for reducing the viscosity of a slurry of a particulate material by the use of anionic siliconates of silylorganocarboxylates, sulfonates and phosphonates as the reducent. By "reducent", it is meant for purposes of this invention, the organosilicon material which when added to a particulate slurry, will give the slurry a viscosity less than the viscosity of the slurry before adding the organosilicon material.

Thus, the method consists of a method of reducing the viscosity of particulate slurries which method comprises (I) contacting an aqueous particulate slurry with an organosilicon compound selected from the group consisting of (i) anionic siliconates of silylorganophosphonates; (ii) anionic siliconates of silylorganosulfonates; and (iii) anionic siliconates of silylorganocarboxylates; (II) intimately mixing the organosilicon compound and the slurry, whereby a slurry, with a viscosity less than the viscosity of the slurry before contacting the organosilicon compound with the slurry, is obtained.

The method of contacting the organosilicon compound reducent and the aqueous slurry is not critical. For example, the reducent and the water for the slurry can be mixed and the particulate matter can be added thereafter with stirring or a more preferred method is to add the reducent to an already prepared aqueous slurry of the particulate material, in-as-much as the particulate materials are generally manufactured in aqueous solutions and its during their manufacturing that the reduction of the viscosity of the slurry is the most helpful. A further example is the addition of the precursor silane of the reducent to the slurry which contains a base, for example NaOH.

The organosilicon reducents are generally used as aqueous solutions since that is also the way in which they are prepared. Most convenient for the method of this invention are those reducents having 20 to 85% solids in water.

The dispersion of the reducent in the aqueous slurry requires minimum stirring and therefore any means by which the reducent or the precursor silane can be dispersed in the aqueous slurry is useful in this invention. For example, the reducents are effective when simply hand mixed with the slurry using a spatula or stirring rod. The reducents can be used and are effective at any reasonable manufacturing temperature and can therefore be used, for example, at 25° C. The reducents are immediately dispersed when added to the slurry and the reduction of the viscosity is realized immediately upon the addition of the reducent without having to wait for the system to equilibrate as is common in other types of methods such as the use of the polyacrylates referred to earlier.

The reducents are used in the slurry at 0.01 to 7.5 weight percent based on the quantity of particulate material in the slurry. Most preferred are 0.05 to 5.0 weight percent of the reducent.

These reducents are used with particulate materials whose concentration in solution are generally 20 to 80 weight percent based on the particulate material, organosilicon compound and water present and therefore, a typical composition of this invention is a composition of matter comprising (I) 20 to 80 weight percent particulate material; (II) 0.01 to 7.5 weight percent of an organosilicon compound selected from the group consisting of (i) alkali siliconates of silylorganophosphonates; (ii) alkali siliconates of silylorganosulfonates and, (iii) alkali siliconates of silylorganocarboxylates and, (III) sufficient water to make a slurry.

A further aspect of this invention is a method of uniformly dispersing a particulate material in an aqueous slurry which method comprises (I) contacting an aqueous particulate slurry with an organosilicon compound selected from the group consisting of (i) anionic siliconates of silylorganophosphonates; (ii) anionic siliconates of silylorganosulfonates; and (iii) anionic siliconates of silylorganocarboxylates; (II) intimately mixing the organosilicon compound and the slurry, whereby a slurry with a more uniform dispersion of particulate material than was extant before the organosilicon compound was contacted with the particulate slurry, is obtained.

As in the method of reducing the viscosity of particulate slurries, the method of contacting the organosilicon compound dispersant and the aqueous slurry is not critical. The dispersant and the water for the slurry can be mixed and the particulate matter can be added thereafter with stirring. A more preferred method is to add the dispersant to an already prepared aqueous slurry of the particulate material prior to the end use of the slurry, in that, the uniformity of dispersibility is highly desirable at this point. It is also part of this invention to add the precursor silane to the aqueous slurry and allow the dispersant to form in-situ by reaction with already present alkali, for example, NaOH.

The organosilicon dispersants are generally used as aqueous solutions since that is also the way in which they are prepared. Most convenient for the method of this invention are those dispersants having 20 to 85% solids in water.

The dispersion of the dispersant in the aqueous slurry requires minimum stirring and therefore any means by which the dispersant or the precursor silane can be dispersed in the aqueous slurry is useful in this invention. For example, the dispersants are effective when simply hand mixed with the slurry using a spatula or stirring rod. The dispersants can be used and are effective at any reasonable manufacturing temperature and can therefore be used, for example, at 25° C. The dispersants are immediately dispersed when added to the slurry and the uniform dispersion of the particles in the slurry is realized immediately upon the addition of the dispersant without having to wait for the system to equilibrate as is common in other types of methods such as the use of the polyacrylates referred to earlier.

The dispersants are used in the slurry at 0.01 to 7.5 weight percent based on the quantity of particulate material in the slurry. Most preferred are 0.05 to 5.0 weight percent of the dispersant.

Another aspect of this invention is the composition of matter obtained by the inventive method herein. The composition of matter comprises (I) a particulate material; (II) an organosilicon compound selected from the group consisting of (i) alkali siliconates of silylorganophosphonates; (ii) alkali siliconates of silylorganosulfonates; and (iii) alkali siliconates of silylorganocarboxylates; and (III) water.

The particulate material can be any pigment or filler material which is finely divided (as opposed to comminuted ores and the like) and is capable of being dispersed in water. Such materials, for example, include inorganic oxides such as titanium dioxide, silicon dioxide, iron oxides, cobalt modified iron oxides, aluminum oxide, antimony oxide, chromium dioxide and the like; clays such as kaolinite, vermiculite, montmorillonite and china clay and the like; zinc oxide, zinc sulfide, basic carbonate white lead, basic sulfate white lead, barium sulfate, calcium carbonate, magnesium silicates, aluminum silicates, mica, and mixtures thereof.

The reducents useful in this invention are all known materials. The materials set forth under (i) above are anionic siliconates of silylorganophosphonates. The precursor silane used for preparing this siliconate can be prepared by many different methods but the highest yielding method is that set forth by Plueddemann in U.S. Pat. No. 4,093,641, issued June 6, 1978, which is hereby incorporated by reference to show the preparation of the precursor silane. The precursor silane is then converted to the salt by contact with the appropriate base, such as, for example, NaOH, to give the alkali metal salt. Such a method is set forth in U.S. Pat. No. 4,370,255, issued Jan. 25, 1983, which is hereby incorporated by reference to show the preparation of the salt of this silane. Such materials have the general formula

wherein M can be independtly an alkali metal cation selected from sodium, potassium, lithium and rubidium cations or tetraorganoammonium cations; R is a divalent aliphatic hydrocarbon radical containing 1 to 3 carbon atoms or the benzylene radical and R' is a hydrocarbon radical of 1 to 7 carbon atoms. The most preferred material is

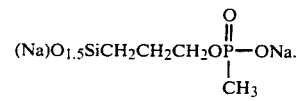

The materials set forth under (ii) above are siliconates of silylorganosulfonates. Such materials useful in this invention are those disclosed in U.S. Pat. No. 4,352,742, issued Oct. 5, 1982 and having the general formula

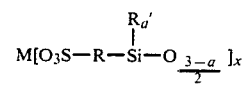

wherein M is a monovalent, divalent or trivalent cation, preferably a monovalent cation selected from the group consisting of alkali metal, ammonium, hydrogen and tetraorganoammonium; x is 1 to 3 and equal to the valence of M; R is a hydroxy-substituted aliphatic divalent group have 3 to about 18 carbon atoms, preferably selected from the group consisting of hydroxy-substituted alkylene and cycloalkylene, alkylene oxyalkylene and cycloalkylene-oxyalkylene groups and said hydroxy-substituent is bonded to a carbon atom vicinal to the carbon atom to which the —O$_3$S— group is bonded; R' is a monovalent alkyl group preferably selected from the group consisting of alkyl and cycloalkyl of 1 to 18 carbon atoms, and a is an integer of 0 to 2. Such materials can be prepared by the reaction of epoxy, or more specifically, glycidoxy silicone precursors with a bisulfite salt in the presence of relatively minor amounts of a sulfate salt. These materials together with processes for their preparation can be found in U.S. Pat. No. 3,507,897, which is incorporated herein by reference to show the methods of preparation.

Another type of silylorganosulfonate useful in this invention are those compounds having the general formula

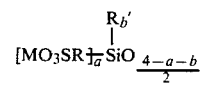

wherein M is a monovalent, divalent or trivalent cation, preferably monovalent, and selected from at least one of the group consisting of ammonium, tetraorganoammonium, hydrogen, and alkali metal cations such as lithium, sodium potassium and cesium; R is a divalent aliphatic hydrocarbon radical preferably selected from the group consisting of alkylene radicals containing from 2 to 30 carbon atoms and cycloalkylene radicals containing from 4 to 18 carbon atoms; R' is an alkyl radical of from 1 to 8 carbon atoms and a has an average value of from 1 to 3, b has an average value of from 0 to 2 and the sum of a+b is 1 to 3. These materials are prepared by oxidizing either a silicone thiuronium salt or thiocyanoalkyl- or thiocyanocycloalkyl silicone. The salts are prepared by the reaction of a sulfoalkyl- or sulfocycloalkyl silicone with a base such as sodium hydroxide or the like, or by treating with ammonia. Such materials are set forth in U.S. Pat. No. 4,354,002, issued Oct. 12, 1982 and such patent is incorporated herein by reference to show the preparation of such compounds.

Yet other types of silylorganosulfonate found useful in this invention are the arylalkyl silicone sulfonates having the general formula

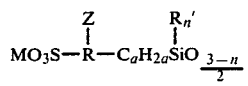

wherein Z is at least one of a hydrogen atom, a monovalent alkyl group having 1 to 8 carbon atoms, a monovalent aryl group or alkyl substituted aryl group having up to 10 carbon atoms in the aryl group and 1 to 8 carbon atoms in the alkyl group, or a monovalent group having any of the formulae:

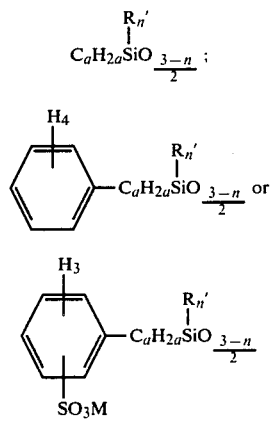

wherein said groups are connected to R through a carbon to carbon linkage; R is a divalent or trivalent aryl group containing up to and including 10 carbon atoms; R' is an alkyl group having 1 to 8 carbon atoms, a is an integer of from 2 to 4 so as to provide that said aryl group is connected to the silicon atom through at least two carbon atoms, n is an integer of from 0 to 2 and M is monovalent, divalent or trivalent cation preferably selected from the group consisting of at least one of hydrogen, alkali metal, tetraorganoammonium and ammonium. The process for the preparation of these materials can be found in U.S. Pat. No. 2,968,643, which is incorporated herein by reference to show such preparations.

Still other types of silylorganosulfonates useful in this invention are those having the general formula

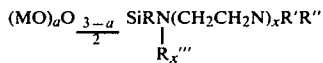

wherein R is a divalent alkylene radical of 3 or 4 carbon atoms; R' is a monovalent radical selected from a group consisting essentially of hydrogen and $-(CH_2)_nSO_3M$; R'' is a monovalent radical selected from a group consisting essentially of $-(CH_2)_nSO_3M$ and

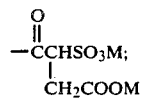

R''' is R' or R''. M in all formulae is an alkali CH COOM cation; n in all formulae has a value of 1, 2 or 3; x has a value of 0 or 1; and a has an average value of 0 to 3. Some of these silylorganosulfonates are known materials and some of them are commercially available. Silylorganosulfonates can be prepared by a number of methods which include, among others, the chlorosulfonic acid sulfonation of aralkylsilanes; the sulfonation of haloalkylarylsilanes using $Na_2SO_3$; the reaction of sodium sulfite with various organofunctional silanes such as

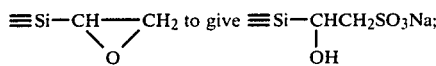

a two step reaction involving the reactions of aminosilanes with unsaturated anhydrides and the subsequent sulfonation of that reaction product by $Na_2SO_3$; the addition of active hydrogen functional silanes to propane sultone; the oxidation of mercaposilanes to the sulfonates; the reaction of formaldehyde-sodium bisulfate adduct; $HOCH_2SO_3Na$ with aminofunctional organosilanes; and the addition of aminofunctional organosilanes to $CH_2=CHSO_3Na$.

The materials set forth under (iii) above are siliconates of silylorganocarboxylates. Such materials useful in this invention are those disclosed in U.S. Pat. No. 3,265,623, issued Aug. 9, 1966 and having the general formula

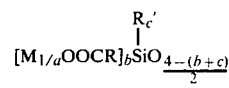

wherein M is a cation that imparts water solubility to the siloxane; a is a valence of the cation represented by M and has a value of at least one; R is an unsubstituted divalent hydrocarbon group or a divalent hydrocarbon group containing a $M_{1/a}OOC-$ group as a substituent; each $M_{1/a}OOC-$ group is connected to the silicon atom through at least two carbon atoms of the group represented by R; R' is a monovalent hydrocarbon group; b has a value of from 1 to 3 inclusive; c has a value of from 0 to 2 inclusive; and (b+c) has a value from 1 to 3 inclusive. U.S. Pat. No. 3,265,623 is incorporated herein by reference to show the preparation of these materials.

Other types of silylorganocarboxylates are those disclosed in U.S. Pat. No. 4,344,860, issued Aug. 17, 1982 and having the general formulae (I) $MOSi(CH_2)_zSR$ and (II) $MOSi(CH_2)_zNH_nR_m$ wherein in both formulae, M is selected from a group consisting essentially of (i) alkali metal cations and (ii) tetraorganoammonium cations and z has a value of 2 or 3, wherein in formula (I) R is selected from a group consisting essentially of $-CH_2COOM$, $-CH_2CH_2COOM$,

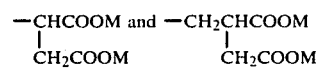

wherein in formula (II), n has a value of 0 or 1; M has a value of 1 or 2, the sum of n+m is 2 and each R is independently selected from a group consisting essentially of $-CH_2COOM$, $-CH_2CH_2COOM$,

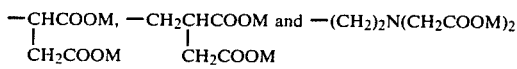

when n is 0 and M is 2, and R is selected from a group consisting essentially of

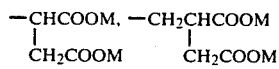

and $(CH_2)_zNH_pR_q'$ when n is 1 and m is 1, p has a value of 0 or 1, q has a value of 1 or 2 and the sum of p+q is 2 wherein R' is selected from a group consisting of

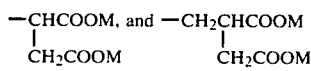

when p is 1 and q is 1 and R' is selected from a group consisting of

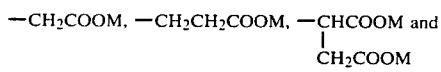

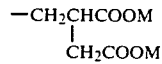

when p is 0 and q is 2, wherein M and z have the same meaning as set forth above.

It should be noted that the reducents as the salt form can be prepared prior to use in the slurry or they can be prepared in-situ by adding the precursor silane to a slurry containing a base such as NaOH.

For purposes of this invention, M can be selected from the alkali cationic groups which are the alkali metal cations and the tetraorganoammonium cations. Thus, M for purposes of this invention can be selected from sodium, potassium, lithium, rubidium, cesium, and the tetraorganoammonium cations such as tetra(alkyl)ammonium cations; tetra- (mixed aryl-alkyl and mixed aralkyl-alkyl ammonium cations and the tetra(hydroxyalkyl)ammonium cations. Preferred are tetra(methyl)ammonium, tetra(ethyl)ammonium, phenyltrimethyl ammonium, benzyltrimethyl ammonium and tetra(hydroxyethyl)ammonium cations. Also considered within the scope of this invention are the polyvalent cations produced by converting polyamines such as guanidine or ethylenediamine to polyammonium hydroxides.

The unoccupied valences of the oxygen atoms attached to the silicon atoms of the siliconate salts can be occupied by M, hydrogen or another silicon atom as long as sufficient oxygen valences are occupied by M or hydrogen to provide compositions that are soluble in aqueous mediums. Generally, a can have an average value from 0 to 3 in the compositions of this invention. However, because polymerization by silanol condensation at a neutral pH can cause a loss of stability in solutions and eventual gelling, it is preferred that a has an average value of 1 to 3 so that at least one oxygen valence is occupied by an alkali metal cation or a tetraorganoammonium cation to provide more soluble compositions that remain stable in solution and do not gel for long periods of time.

Now so that those skilled in the art understand and appreciate the invention, the following examples are offered. These examples should not be construed as limiting that which is set out and claimed as the invention in the appended claims.

Glossary

The materials used in the examples were obtained from the companies indicated below. The properties of the materials are shown as well.

NL 2131 Titanox ($TiO_2$)—Titanium Pigment Corp., 111 Broadway, New York, N.Y., U.S.A. This material is Rutile $TiO_2$ consisting of at least 90 weight percent $TiO_2$ with the remainder principally alumina and silica. Sp. G. is 3.7; oil absorption ±10% is 44.0; retained on 325 mesh (U.S. standard) is 0.01% max. and the pH is 7.5 to 8.8.

Titanox 2101—Titanium Pigment Corp. This material is Rutile $TiO_2$ consisting of at least 90 weight percent $TiO_2$ with the remainder principally aluminum silicate. Sp. G. is 4.0; oil absorption (±10%) is 21.0; retained on 325 mesh (U.S. standard) is 0.01% max. and the pH is 7.3 to 8.3.

R-960 Ti-Pure ($TiO_2$)—E. I. duPont de Nemours & Co. Inc., Wilmington, Del., U.S.A.

Mica C-3000—The English Mica Co., Stamford, Conn. 06905 U.S.A. Sp. G. is 2.82; oil absorption 60–74; and the pH is 8.0.

Camel White (Clay)—Harry T. Campbell Sons' Corp., Baltimore, Md. U.S.A. This material is fractionated calcium carbonate processed from calcite (98%). The particle size averages 2.0 microns. Sp. G. is 2.71; oil absorption is 15 and pH is 8.5 in a saturated solution.

ASP-400 (Clay)—Engelhard Minerals and Chemicals, Menlo Park, Ca., U.S.A. This material is hydrous aluminum silicate having an average particle size of 4.8 microns. Sp. G.=2.58; oil absorption is 28–32 and the pH is 3.8 to 4.6.

Brookfield Viscometers—Brookfield Engineering Laboratories, Inc., Stoughton, Mass., U.S.A. 02072.

SCM $TiO_2$—SCM Glidden, Baltimore, Md. U.S.A. A slurry of $TiO_2$ (production grade).

Zinc Oxide—J. T. Baker Chemical Co., Phillipsburg, N.J., 08865

Calcium Carbonate—Thompson, Weinman and Co., New York, N.Y., U.S.A. Particle size range 1 to 20 microns; oil absorption 9 to 10; Sp. G. is 2.71 and pH is 9.2 to 9.4.

Tamol 850—Rohm and Haas, Philadelphia, Pa., U.S.A. Sodium polyacrylate viscosity depressant at 30% solids.

*Brookfield Viscometer*—All viscosities shown in this specification unless indicated otherwise were measured using a Brookfield Model RVTD Viscometer. Spindle sizes and speed in RPM are shown in each example.

*Wet Point Procedure*—This procedure is performed in a small plastic or glass vessel wherein the particulate material is placed in the vessel and titrated with a liquid (in this case water) and stirred (usually with a spatula) until the wet point is reached. The wet point is that point during titration that the particulate mass has had sufficient liquid added to it to provide a soft coherent, uniform mass. The wet point is recorded as the milliliters of liquid needed to reach the wet point. Sometimes the wet point is reported as the percent solids of the mass at the wet point.

*Flow Point Procedure*—Flow point is essentially a continuation of the titration beyond the wet point until the mass has enough fluidity to fall from the vertical blade of a horizontally held spatula. The total milliliters of water that is needed to titrate to this point is the flow point reading.

EXAMPLE 1

A TiO$_2$ pigment slurry was prepared in the following manner. Twenty-five grams of NL 2131 Titanax TiO$_2$ were placed in an eight ounce french square bottle. To this pigment there was added increments of distilled water and the pigment was stirred after each addition, using a metal spatula. The viscosity of the mixture was checked after each addition using a Brookfield viscometer and a #4 spindle at 60 RPM. As the viscosity decreased, the spindle was changed to #2 and the changes are noted in the table below (Table I). A slurry viscosity reducing siliconate of this invention was then tested by repeating the above steps after the siliconate was first added to the TiO$_2$ in a glass bottle. The siliconate was tested at the 0.1 and 0.25 weight percent active solids levels based on the amount of TiO$_2$ in the samples. The siliconate was a 50 weight percent aqueous solution of

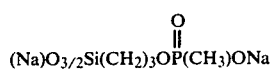

$$(Na)O_{3/2}Si(CH_2)_3OP(CH_3)ONa$$

and the results can be found on Table I. It is apparent from the data that the siliconate, at low levels can significantly reduce the viscosity of the slurry.

TABLE I

| | | Results From Example I | | | |
|---|---|---|---|---|---|
| | | *Viscosity in cp @ 25° C. | | | |
| Sample | % Solids | (i) | (ii) | (iii) | Spindle # |
| A | 61 | + | + | 1177 | 4 |
| B | 60 | + | 2320 | 680 | 4 |
| C | 58 | + | 1120 | 113 | 4 |
| D | 57 | + | 460 | — | 4 |
| E | 56 | + | 80 | — | 4 |
| F | 50 | 1600 | — | — | 4 |
| G | 45 | 1400 | — | — | 4 |
| H | 42 | 1000 | — | — | 4 |
| I | 40 | 680 | — | — | 4 |
| J | 33.3 | 480 | — | — | 4 |
| K | 20 | 110 | 11 | 11 | 2 |

*Sample (i) has zero siliconate additive
Sample (ii) has 0.1 weight % additive
Sample (iii) has 0.25 weight % additive
+Not yet a slurry or too viscous to measure by Brookfield.

EXAMPLE 2

In a manner similar to that of Example 1, a second evaluation was made using NL 2131 Titanax TiO$_2$ and a siliconate having the approximate formula

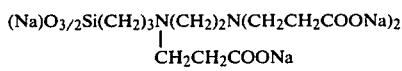

$$(Na)O_{3/2}Si(CH_2)_3N(CH_2)_2N(CH_2CH_2COONa)_2$$
$$|$$
$$CH_2CH_2COONa$$

This material was used as a 44 weight percent aqueous solution wherein the level used in this example was 0.1 active solids. To a 4 ounce glass bottle there was added the above siliconate and twenty-five grams of the TiO$_2$. To this mixture, there was added small increments of distilled water and after each addition, the mixture was stirred with a metal spatula. The viscosity of the mixture was observed and water was added until a 60 percent solids mixture was obtained. At this point, the viscosity had reduced to the point where a soft paste was formed such that it did not resist the action of the spatula. (At this point, 17 grams of water had been added.) When the water addition had reached 24 grams, the viscosity was low enough that one drop of the mixture would run easily off the tip of the spatula (51% solids).

When 0.1 weight percent deionized water was substituted for the siliconate in a similar experiment, it took twenty-four grams of water before there was no resistance to the spatula (51% solids). When this material reached 20% solids, it was finally low enough in viscosity such that a drop would run off the tip of the spatula. Thus it is apparent that the siliconate had the ability to lower the viscosity of the TiO$_2$ slurry without dramatically lowering the solids content of the slurry.

EXAMPLE 3

A one gallon sample of 49.7 weight percent aqueous TiO$_2$ slurry (SCM-Glidden production grade) was agitated on a high shear mixer to obtain a homogeneous slurry. To one sample of the slurry there was added varying amounts of the siliconate that was used in Example 1 and this sample was designated "A". A baseline was established by diluting the slurry with water, without adding any siliconate and the viscosities were measured and compared to Sample "A". This control was designated "B". A third sample using the siliconate

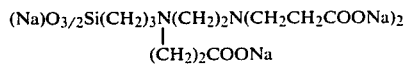

$$(Na)O_{3/2}Si(CH_2)_3N(CH_2)_2N(CH_2CH_2COONa)_2$$
$$|$$
$$(CH_2)_2COONa$$

was also prepared and evaluated as Example "C". The spindle # is noted on the following Table II and the speed was 2 RPM. The results are on Table II.

TABLE II

| | Results From Example 3 | | | |
|---|---|---|---|---|
| Slurry | Viscosity In cp @ 25° C. | | | % Siliconate |
| % Solids | A | B | C | (Active Solids) |
| 49.7 | 64,000 | 64,000 | 69,000 | 0 |
| 49.6 | 55,000 | — | — | 0.0125 |
| 49.6 | 37,050 | — | 54,000* | 0.025 |
| 49.5 | 24,600 | — | — | 0.0375 |
| 49.5 | 15,840 | — | 25,600* | 0.05 |
| 49.4 | 9,500 | — | — | 0.0625 |
| 49.4 | 6,230 | — | 10,800* | 0.075 |
| 49.3 | 4,267 | — | — | 0.0875 |
| — | — | — | 6,000** | 0.10 |
| 49.1 | 3,200 | — | 2,500** | 0.125 |
| 48.7 | — | 45,000 | — | 0 |
| 48.6 | 600 | — | — | 0.25 |
| 47.7 | — | 18,000 | — | 0 |
| 46.7 | — | 15,000 | — | 0 |
| 45.8 | — | 11,000 | — | 0 |
| 44.9 | — | 8,000 | — | 0 |

*Spindle #4
**Spindle #2

It is apparent that both siliconates were effective in reducing the slurry viscosity without significantly reducing the solids content of the slurry.

EXAMPLE 4

Several samples were prepared by adding 100 grams of ASP-400 clay (100 grams) and varying amounts of the siliconate

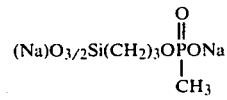

$$(Na)O_{3/2}Si(CH_2)_3OPONa$$
$$|$$
$$CH_3$$

to a ball mill containing ¼" ceramic balls and the mixture was milled for several hours until it appeared homogeneous. Within the first two hours, the sample designated "A" and the sample designated "B" had to have an additional 50 grams of water added to them because their viscosity was too high. The samples were:

|   | Grams Clay | Grams H$_2$O | Grams Siliconate |
|---|---|---|---|
| A | 100 | 150 | 0 |
| B | 100 | 150 | 0.1 |
| C | 100 | 100 | 0.5 |
| D | 100 | 100 | 1.5 |

A fifth sample was prepared by hand mixing 100 grams of clay and 100 grams of water. No siliconate was added to this sample which was designated E.

The results can be found on Table III. Spindle #4 and speed of 2 RPM was used in this example.

TABLE III
Results of Example 4

| Sample | Weight % Siliconate | pH | Viscosity in cp @ 25° C. (Avg. of Four) | % Solids |
|---|---|---|---|---|
| A | 0 | 4.9 | 3320 | 40 |
| B | 0.1 | 5.3 | 2405 | 40 |
| C | 0.5 | 5.8 | 688 | 50 |
| D | 1.0 | 6.4 | 50 | 50 |
| E | 0 | 4.8 | 4000 | 50 |

The hand shaken Sample "E" was treated with varying quantities of the siliconate with the following results (Sample F).

| | | | |
|---|---|---|---|
| F(i) | 0 | 4.8 | 4000 |
| F(ii) | 0.05 | 4.9 | 2500 |
| F(iii) | 0.10 | 5.0 | 2267 |
| F(iv) | 0.20 | 5.1 | 161 |
| F(v) | 0.50 | 5.5 | 12 |

It is obvious that the siliconates of this invention have the ability to reduce the viscosity of clay slurries.

EXAMPLE 5

A slurry of TiO$_2$ (Ti-Pure R960) in water was prepared by titrating the TiO$_2$ to its wet point (72% solids). This material was a very thick paste to which increasing quantities of water (Sample "A"), Tamol 850 (Sample "B") and

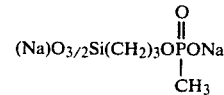

(Sample "C"), were added in increasing quantities. The viscosities were measured using a Brookfield viscometer. The RPM and spindle numbers are noted. The results can be found in Table IV.

TABLE IV
Results From Example 5
Viscosity of the Slurry in cp @ 25° C.
% Additive Solids Based on TiO$_2$

| Sample | 0 | 0.05 | 0.10 | 0.15 | 0.20 | 0.25 | 0.30 |
|---|---|---|---|---|---|---|---|
| A | 5,200,000* | 3,800,000* | 3,100,000* | 3,000,000* | 2,600,000* | 2,200,000* | 2,000,000* |
| B | 5,200,000* | 220,000** | 650*** | 610*** | 780*** | 800*** | 1040*** |
| C | 5,200,000* | 620,000** | 420*** | 40*** | 40*** | 48*** | 40*** |

*F-T Spindle @ 1 RPM
**C-T Spindle @ 1 RPM
***RV2 Spindle @ 10 RPM

EXAMPLE 6

The wet point and flow points of various slurries of particulate minerals using four siliconates of this invention were measured.

Siliconate "i" is

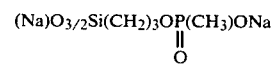

Siliconate "ii" is

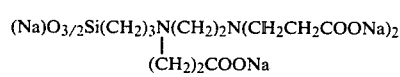

Siliconate "iii" is (Na)O$_{3/2}$SiCH$_2$CH$_2$COONa and Siliconate "iv" is

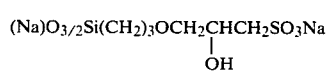

The results of the evaluations can be found on Table V.

TABLE V
Results From Example 6

| | | | H$_2$O Only | | (i) | | (ii) | | (iii) | | (iv) | |
|---|---|---|---|---|---|---|---|---|---|---|---|---|
| Sample | Fine Particulate Material | Amount | W.P.* | F.P.** | W.P. | F.P. | W.P. | F.P. | W.P. | F.P. | W.P. | F.P. |
| A | CaCO$_3$ | 50 gms | 14 | 19 | 11.5 | 16.5 | 13 | 19 | 14 | 19 | — | — |
| B | ZnO | 50 gms | 26 | 90 | 18 | 19.5 | 21 | 28 | 18 | 19 | 17 | 26 |
| C | TiO$_2$ (Titanox 2101) | 50 gms | 16 | 24 | 14 | 15 | 13 | 15 | — | — | — | — |
| D | TiO$_2$ (Titanox 2131) | 50 gms | 31 | 50 | 28 | 32 | 30 | 33 | — | — | — | — |
| E | TiO$_2$ (R-960) | 50 gms | 18 | 30 | 11.5 | 12 | 14 | 15 | 14 | 15 | 12 | 13 |
| F | MICA (C-3000) | 50 gms | 50 | 66 | 50 | 57 | 50 | 68 | — | — | — | — |
| G | CaCO$_3$ (Camel White) | 50 gms | 14.5 | 22 | 14.5 | 21 | 14.5 | 22 | — | — | — | — |
| H | Clay (ASP-400) | 50 gms | 22 | 31.5 | 22 | 23 | 22 | 26 | 21 | 24 | 20.5 | 25 |

TABLE V-continued

| Sample | Fine Particulate Material | Amount | Results From Example 6 | | | | | | | | |
|---|---|---|---|---|---|---|---|---|---|---|---|
| | | | H₂O Only | | (i) | | (ii) | | (iii) | | (iv) |
| | | | W.P.* | F.P.** | W.P. | F.P. | W.P. | F.P. | W.P. | F.P. | W.P. | F.P. |
| I | γ-Fe₂O₃ | 5 gms | 37 | 100 | 37 | 100 | 37 | 90 | — | — | — | — |

*W.P. = Wet Point
**F.P. = Flow Point

The results show that the siliconates do have an effect on the wet points and flow points of the particulate materials.

EXAMPLE 7

Three hundred grams of a cobalt surface modified iron oxide (Pferrico 2566, average length 0.40 microns, average width 0.07 microns, pH 7.0, surface area 22.5 and oil absorption of 51 in ml/100 g (manufactured by Pfizer, Easton, PA U.S.A.) was mixed with 400 ml of deionized water in a Waring Blender at high shear for several minutes. The viscosity increased to such a level that mixing stopped. Additional water was added until the slurry reached 27.5 wt % solids. The viscosity was still too high for good mixing. At this point increments of a 50 wt % aqueous solution of $$(Na)O_{3/2}Si(CH_2)_3\overset{O}{\overset{\|}{O}}P(CH_3)ONa$$

were added. At a level of 0.7 wt % the slurry viscosity dropped to a lower level and excellent mixing was obtained. The Brookfield Viscosity (20 RPM, Spindle No. 6) was 4550 cps. Additional siliconate was added and the results in Table VI were obtained. It is apparent from the data that the siliconate, at low levels, can significantly reduce the viscosity of the slurry and that there is a point reached where the viscosity reduction effect becomes limited.

TABLE VI

| Sample | Gms. Of Siliconate | Wt. % Siliconate | Reading | Spindle No. | RPM | Factor | Visc. (CPS) |
|---|---|---|---|---|---|---|---|
| A | 4.2 | 0.70 | 9.1 | 6 | 20 | 500 | 4550 |
| B | 4.8 | 0.79 | 16.1 | 5 | 20 | 200 | 3220 |
| C | 5.4 | 0.89 | 8.4 | 5 | 20 | 200 | 1680 |
| D | 6.0 | 0.96 | 7.8 | 4 | 20 | 100 | 780 |
| E | 6.6 | 1.06 | 10.9 | 3 | 20 | 50 | 545 |
| F | 7.2 | 1.15 | 10.2 | 3 | 20 | 50 | 510 |
| G | 7.8 | 1.25 | 9.9 | 3 | 20 | 50 | 495 |
| H | 8.4 | 1.35 | 9.9 | 3 | 20 | 50 | 495 |
| I | 9.6 | 1.54 | 9.5 | 3 | 20 | 50 | 475 |
| J | 10.8 | 1.74 | 9.5 | 3 | 20 | 50 | 475 |
| K | 12.0 | 1.93 | 9.7 | 3 | 20 | 50 | 485 |
| L | 13.2 | 2.12 | 9.8 | 3 | 20 | 50 | 490 |
| M | 14.4 | 2.31 | 9.8 | 3 | 20 | 50 | 490 |
| N | 15.6 | 2.50 | 9.8 | 3 | 20 | 50 | 490 |

That which is claimed:

1. A method of reducing the viscosity of particulate slurries which method comprises
   (I) contacting an aqueous particulate slurry with an organosilicon compound selected from the group consisting of (i) anionic siliconates of silylorganophosphonates; (ii) anionic siliconates of silylorganosulfonates; and (iii) anionic siliconates of silylorganocarboxylates;
   (II) intimately mixing the organosilicon compound and the slurry, whereby a slurry with a viscosity less than the viscosity of the slurry before contacting the organosilicon compound with the slurry, is obtained.

2. A method as claimed in claim 1 wherein the organosilicon compound is an alkali siliconate of a silylorganophosphonate.

3. A method as claimed in claim 2 wherein the alkali siliconate silylorganophosphonate has the general formula $$\begin{array}{c} O \\ \| \\ MOSiROP(O)OM \\ | \phantom{xx} | \\ O \phantom{xx} R' \\ | \end{array}$$

wherein M is selected from a group consisting essentially of alkaline metal cations selected from a group consisting of sodium, potassium, lithium, rubidium, and cesium, and tetraorgano ammonium cations; R is a divalent aliphatic hydrocarbon radical containing 1 to 3 carbon atoms or the benzylene radical; P is the phosphorous atom and, R' is a hydrocarbon radical containing from 1 to 7 carbon atoms.

4. A method as claimed in claim 3 wherein M in each case is sodium, R is —CH₂—ₓ and R' is methyl.

5. A method as claimed in claim 4 wherein x has a value of 3.

6. A method as claimed in claim 3 wherein M in each case is potassium, R is —CH₂—ₓ and R' is methyl.

7. A method as claimed in claim 6 wherein x has a value of 3.

8. A method as claimed in claim 3 wherein the alkali siliconate silylorganophosphonate is present in the particulate slurry at 0.01 to 7.5 weight percent based on the weight of the particulate in the slurry.

9. A method as claimed in claim 3 wherein the alkali siliconate silylorganophosphonate is present in the particulate slurry at 0.05 to 5.0 weight percent based on the weight of the particulate in the slurry.

10. A method as claimed in claim 1 wherein the organosilicon compound is a alkali siliconate of a silylorganosulfonate.

11. A method as claimed in claim 10 wherein the alkali siliconate silylorganosulfonate has the general formula $$(MO)_aO_{\frac{3-a}{2}}SiRN(CH_2CH_2N)_xR'R'' \atop R_{x'''}$$

wherein R is a divalent alkylene radical of 3 or 4 carbon atoms; R' is a monovalent radical selected from a group consisting essentially of hydrogen and —(CH₂)ₙSO₃M; R" is a monovalent radical selected from a group consisting essentially of —(CH₂)ₙSO₃M and

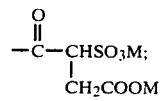

R‴ is R′ or R″; M in all formulas is an alkali cation; n in all formulas has a value of 1, 2 or 3; x has a value of 0 or 1; and a has an average value of 0 to 3.

12. A method as claimed in claim 11 wherein M is sodium, R′ is hydrogen and R″ is

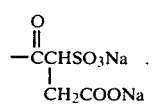

13. A method as claimed in claim 11 wherein M is sodium, R′ is hydrogen and R″ is —CH$_2$SO$_3$Na.

14. A method as claimed in claim 11 wherein M is sodium, R′ is —(CH$_2$)$_n$SO$_3$Na and R″ is —(CH$_2$)$_n$SO$_3$Na.

15. A method as claimed in claim 11 wherein M is sodium, R′ is hydrogen and R″ is

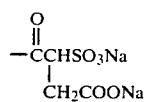

and R‴ is

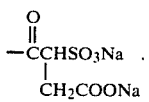

16. A method as claimed in claim 14 wherein in each case, n has a value of 1.

17. A method as claimed in claim 14 wherein in each case, n has a value of 3.

18. A method as claimed in claim 11 wherein the alkali siliconate silylorganosulfonate is present in the particulate slurry at 0.01 to 7.5 weight percent.

19. A method as claimed in claim 11 wherein the alkali siliconate silylorganosulfonate is present in the particulate slurry at 0.05 to 5.0 weight percent.

20. A method as claimed in claim 10 wherein the alkali siliconate silylorganosulfonate has the general formula

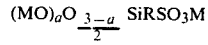

wherein R is a divalent aliphatic hydrocarbon radical; M in each case is an alkali cation and a has an average value of 0 to 3.

21. A method as claimed in claim 20 wherein M in each case is sodium and R is —(CH$_2$)$_x$—.

22. A method as claimed in claim 21 wherein x has a value of 3.

23. A method as claimed in claim 20 wherein the sulfonate is γ-(sodium sulfopropyl)siloxane having the formula NaO$_3$SCH$_2$CH$_2$CH$_2$SiO$_{1.5}$(Na).

24. A method as claimed in claim 20 wherein alkali siliconate silylorganosulfonate is present in the particulate slurry at 0.01 to 7.5 weight percent based on the weight of the particulate in the slurry.

25. A method as claimed in claim 10 wherein the alkali siliconate silylorganosulfonate has the general formula

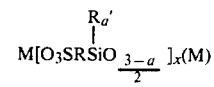

wherein M is a monovalent, divalent or trivalent cation; x has a value of 1 to 3 and equal to the valence of M; R is a hydroxy-substituted divalent group having 3 to 18 carbon atoms and said hydroxy substituent is bonded to a carbon atom vicinal to the carbon atom to which the —O$_3$S— group is bonded; R′ is a monovalent alkyl group having 1 to 8 carbon atoms and, a is an integer of 0 to 2.

26. A method as claimed in claim 25 wherein the alkali siliconate silylorganosulfonate is

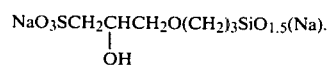

27. A method as claimed in claim 25 wherein the alkali siliconate silylorganosulfonate is

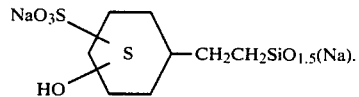

28. A method as claimed in claim 25 wherein the alkali siliconate silylorganosulfonate is present in the particulate slurry at 0.01 to 7.5 weight percent based on the weight of the particulate in the slurry.

29. A method as claimed in claim 10 wherein the alkali siliconate silylorganosulfonate has the general formula

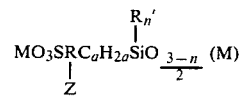

wherein Z is at least one of a hydrogen atom, a monovalent alkyl group having 1 to 8 carbon atoms, a monovalent aryl group or alkyl substituted aryl group having up to 10 carbon atoms in the aryl group and 1 to 8 carbon atoms in the alkyl group, or a monovalent group having a formula selected from the group consisting of

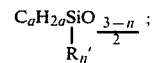

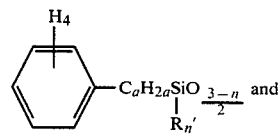

-continued

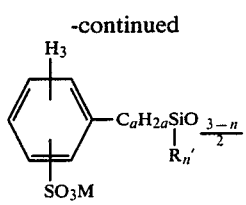

wherein said groups are connected to R through a carbon to carbon linkage, R is a divalent or trivalent aryl group containing up to and including 10 carbon atoms, R' is an alkyl group, a is an integer of from 2 to 4, n is an integer of from 0 to 2 and, M is a monovalent, divalent or trivalant cation.

30. A method as claimed in claim 29 wherein the alkali siliconate silylorganosulfonate is

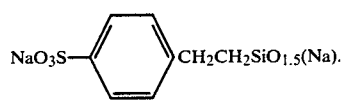

31. A method as claimed in claim 29 wherein the alkali siliconate silylorganosulfonate is

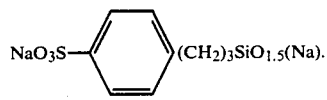

32. A method as claimed in claim 29 wherein the alkali siliconate silylorganosulfonate is present in the particulate slurry at 0.01 to 7.5 weight percent based on the weight of the particulate in the slurry.

33. A method as claimed in claim 1 wherein the organosilicon compound is an alkali siliconate silylorganocarboxylate.

34. A method as claimed in claim 33 wherein the alkali siliconate silylorganocarboxylate has the general formula

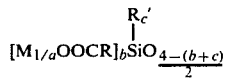

wherein M is selected from a group consisting essentially of alkaline metal cations selected from a group consisting of sodium, potassium, lithium, and rubidium, and tetraorganoammonium cations; a is the valence of the cation represented by M and b is an integer having a value of at least one, R is selected from the group consisting of unsubstituted divalent hydrocarbon groups, $M_{1/a}OCC-$ and substituted divalent hydrocarbon groups, each $M_{1/a}OOC-$group is connected to the silicon atom through at least 2 carbon atoms of the group represented by R; R' is a monovalent hydrocarbon group; b is an integer having a value of 1 to 3 inclusive; c is an integer having a value of 0 to 2 inclusive and, b+c has a value of from 1 to 3 inclusive.

35. A method as claimed in claim 34 wherein the alkali siliconate silylorganocarboxylate is $KOOCCH_2CH_2SiO_{1.5}(K)$.

36. A method as claimed in claim 34 wherein the alkali siliconate silylorganocarboxylate is $KOOCCH_2CH_2Si(CH_3)O(K)$.

37. A method as claimed in claim 34 wherein the alkali siliconate silylorganocarboxylate is $KOOC(CH_2)_3SiO_{1.5}(K)$.

38. A method as claimed in claim 34 wherein the alkali siliconate silylorganocarboxylate is $NaOOC(CH_2Si(CH_3)O(Na)$.

39. A method as claimed in claim 34 wherein the alkali siliconate silylorganocarboxylate is present in the particulate slurry at 0.01 to 7.5 weight percent based on the weight of the particulate in the slurry.

40. A method as claimed in claim 33 wherein the alkali siliconate silylorganocarboxylate is selected from a group consisting essentially of (I) a siliconate having the general formula

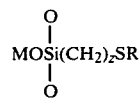

and (II) a siliconate having the general formula

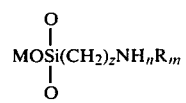

wherein in both formulas, M is selected from a group consisting essentially of (i) alkali metal cations and (ii) tetraorganoammonium cations and z has a value of 2 or 3, wherein in formula (I), R is selected from a group consisting essentially of $-CH_2COOM$, $-CH_2CH_2COOM$,

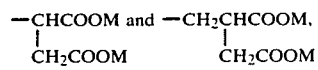

wherein in formula (II), n has a value of 0 or 1; M has a value of 1 or 2, the sum of n+m is 2 and each R is independently selected from a group consisting essentially of $-CH_2COOM$, $-CH_2CH_2COOM$,

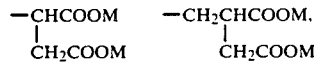

and $-(CH_2)_2N(CH_2COOM)_2$ when n is 0 and m is 2, and R is selected from a group consisting essentially of

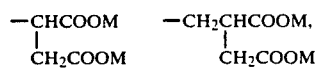

and $(CH_2)_zNH_pR_q'$ when n is 1 and m is 1, p has a value of 0 or 1, q has a value of 1 or 2 and the sum of p+q is 2 wherein R' is selected from a group consisting of

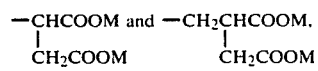

when p is 1 and q is 1 and R' is selected from a group consisting of $-CH_2COOM$, $-CH_2CH_2COOM$,

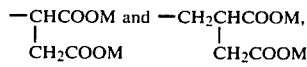

when p is 0 and q is 2, wherein M and z have the same meaning as set forth above.

41. A method as claimed in claim 40 wherein the siliconate has the formula (NaOOCCH$_2$)$_2$N(CH$_2$)$_3$SiO$_{1.5}$(Na).

42. A method as claimed in claim 40 wherein the siliconate has the formula

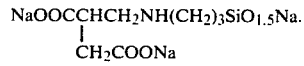

43. A method as claimed in claim 40 wherein the siliconate has the formula (NaOOCCH$_2$CH$_2$)$_2$N(CH$_2$)$_3$SiO$_{1.5}$(Na).

44. A method as claimed in claim 40 wherein the siliconate has the formula (NaOOCCH$_2$)$_2$N(CH$_2$)$_2$NH(CH$_2$)$_3$SiO$_{1.5}$(Na).

45. A method as claimed in claim 40 wherein the siliconate has the formula

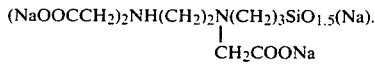

46. A method as claimed in claim 40 wherein the siliconate has the formula (NaOOCCH$_2$CH$_2$)$_2$NCH$_2$CH$_2$NH(CH$_2$)$_3$SiO$_{1.5}$(Na).

47. A method as claimed in claim 40 wherein the siliconate has the formula

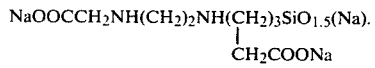

48. A method as claimed in claim 40 wherein the siliconate has the formula

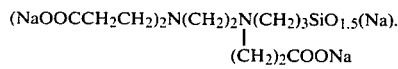

49. A method as claimed in claim 40 wherein the siliconate has the formula

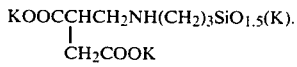

50. A method as claimed in claim 40 wherein the siliconate has the formula (KOOCCH$_2$CH$_2$)$_2$N(CH$_2$)$_3$SiO$_{1.5}$(K).

51. A method as claimed in claim 40 wherein the siliconate has the formula (KOOCCH$_2$)$_2$N(CH$_2$)$_2$NH(CH$_2$)$_3$SiO$_{1.5}$(K).

52. A method as claimed in claim 40 wherein the siliconate has the formula

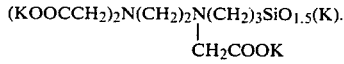

53. A method as claimed in claim 40 wherein the siliconate has the formula (KOOCCH$_2$CH$_2$)$_2$N(CH$_2$)$_2$NH(CH$_2$)$_3$SiO$_{1.5}$(K).

54. A method as claimed in claim 40 wherein the siliconate has the formula

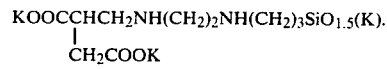

55. A method as claimed in claim 40 wherein the siliconate has the formula

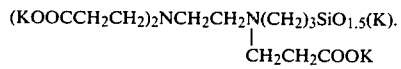

56. A method as claimed in claim 40 wherein the siliconate has the formula NaOOCCH$_2$SCH$_2$CH$_2$SiO$_{1.5}$(Na).

57. A method as claimed in claim 40 wherein the siliconate has the formula

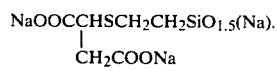

58. A method as claimed in claim 40 wherein the siliconate has the formula

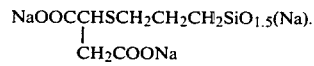

59. A method as claimed in claim 40 wherein the siliconate has the formula

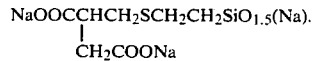

60. A method as claimed in claim 40 wherein the siliconate has the formula

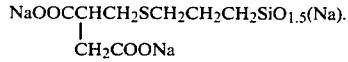

61. A method as claimed in claim 40 wherein the siliconate has the formula KOOCCH$_2$SCH$_2$CH$_2$SiO$_{1.5}$(K).

62. A method as claimed in claim 40 wherein the siliconate has the formula

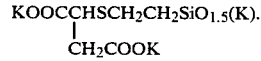

63. A method as claimed in claim 40 wherein the siliconate has the formula

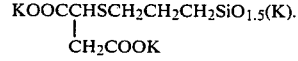

64. A method as claimed in claim 40 wherein the siliconate has the formula $$\underset{\underset{\text{CH}_2\text{COOK}}{|}}{\text{KOOCCHCH}_2\text{SCH}_2\text{CH}_2\text{SiO}_{1.5}\text{(K)}.}$$

65. A method as claimed in claim 40 wherein the siliconate has the formula $$\underset{\underset{\text{CH}_2\text{COOK}}{|}}{\text{KOOCCHCH}_2\text{SCH}_2\text{CH}_2\text{CH}_2\text{SiO}_{1.5}\text{(K)}.}$$

66. A method as claimed in claim 1 wherein the particulate in the slurry is selected from a group consisting of titanium dioxide, zinc oxide, iron oxide, cobalt modified iron oxide, chromium oxides, zinc sulfide, antimony oxide, basic carbonate white lead, basic sulfate white lead, barium sulfate, calcium carbonate, silica dioxide, magnesium silicate, aluminum silicate, mica and mixtures thereof.

67. A method as claimed in claim 66 wherein the organosilicon compound is an alkali siliconate silylorganophosphonate.

68. A method as claimed in claim 66 wherein the organosilicon compound is an alkali siliconate silylorganosulfonate.

69. A method as claimed in claim 66 wherein the organosilicon compound is an alkali siliconate silylorganocarboxylate.

70. A composition of matter which is a slurry, comprising (I) a particulate material; (II) an organosilicon compound selected from the group consisting of (i) anionic siliconates of silylorganophosphonates; (ii) anionic siliconates of silylorganosulfonates and, (iii) anionic siliconates of silylorganocarboxylates and, (III) water.

71. A composition of matter comprising (I) 20 to 80 weight percent particulate material; (II) 0.01 to 7.5 weight percent of an organosilicon compound selected from the group consisting of (i) alkali siliconates of silylorganophosphonates; (ii) alkali siliconates of silylorganosulfonates and, (iii) alkali siliconates of silylorganocarboxylates and, (III) sufficient water to make a slurry.

72. A composition of matter as claimed in claim 71 wherein component (II) is an alkali siliconate silylorganophosphonate.

73. A composition of matter as claimed in claim 72 wherein the alkali siliconate silylorganophosphonate has the general formula

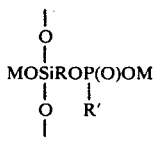

wherein M is selected from a group consisting essentially of alkaline metal cations selected from a group consisting of sodium, potassium, lithium, rubidium, and cesium, and tetraorgano ammonium cations; R is a divalent aliphatic hydrocarbon radical containing 1 to 3 carbon atoms or the benzylene radical; P is the phosphorous atom and, R' is a hydrocarbon radical containing from 1 to 7 carbon atoms.

74. A composition as claimed in claim 73 wherein M in each case is sodium, R is —CH$_2$—$_x$ and R' is methyl.

75. A composition as claimed in claim 74 wherein x has a value of 3.

76. A composition as claimed in claim 73 wherein M in each case is potassium, R is —CH$_2$—$_x$ and R' is methyl.

77. A composition as claimed in claim 76 wherein x has a value of 3.

78. A composition as claimed in claim 73 wherein the alkali siliconate silylorganophosphonate is present in the particulate slurry at 0.01 to 7.5 weight percent based on the weight of the particulate in the slurry.

79. A composition as claimed in claim 73 wherein the alkali siliconate silylorganophosphonate is present in the particulate slurry at 0.05 to 5.0 weight percent based on the weight of the particulate in the slurry.

80. A composition as claimed in claim 71 wherein component (II) is an alkali siliconate silylorganosulfonate.

81. A composition as claimed in claim 80 wherein the alkali siliconate silylorganosulfonate has the general formula $$(MO)_a O_{\frac{3-a}{2}} SiRN(CH_2CH_2N)_x R'R'' \\ | \\ R_x'''$$

wherein R is a divalent alkylene radical of 3 or 4 carbon atoms; R' is a monovalent radical selected from a group consisting essentially of hydrogen and —(CH$_2$)$_n$SO$_3$M; R'' is a monovalent radical selected from a group consisting essentially of —(CH$_2$)$_n$SO$_3$M and

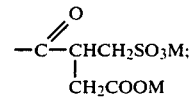

R''' is R' or R''; M in all formulas is an alkali cation; n in all formulas has a value of 1, 2 or 3; x has a value of 0 or 1; and a has an average value of 0 to 3.

82. A composition as claimed in claim 81 wherein M is sodium, R' is hydrogen and R'' is

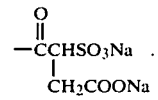

83. A composition as claimed in claim 81 wherein M is sodium, R' is hydrogen and R'' is —CH$_2$SO$_3$Na.

84. A composition as claimed in claim 81 wherein M is sodium, R' is —(CH$_2$)$_n$SO$_3$Na and R'' is —(CH$_2$)$_n$SO$_3$Na.

85. A composition as claimed in claim 81 wherein M is sodium, R' is hydrogen and R'' is

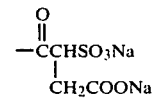

and R''' is

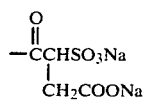

86. A composition as claimed in claim 84 wherein in each case, n has a value of 1.

87. A composition as claimed in claim 84 wherein in each case, n has a value of 3.

88. A composition as claimed in claim 81 wherein the alkali siliconate silylorganosulfonate is present in the particulate slurry at 0.01 to 7.5 weight percent.

89. A composition as claimed in claim 81 wherein the alkali siliconate silylorganosulfonate is present in the particulate slurry at 0.05 to 5.0 weight percent.

90. A composition as claimed in claim 80 wherein the alkali siliconate silylorganosulfonate has the general formula

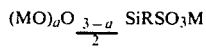

wherein R is a divalent aliphatic hydrocarbon radical; M in each case is an alkali cation and a has an average value of 0 to 3.

91. A composition as claimed in claim 90 wherein M in each case is sodium and R is $-(CH_2)_x-$.

92. A composition as claimed in claim 91 wherein x has a value of 3.

93. A composition as claimed in claim 90 wherein the sulfonate is γ-(sodium sulfopropyl)siloxane having the formula $NaO_3SCH_2CH_2CH_2SiO_{1.5}(Na)$.

94. A composition as claimed in claim 90 wherein alkali siliconate silylorganosulfonate is present in the particulate slurry at 0.01 to 7.5 weight percent based on the weight of the particulate in the slurry.

95. A composition as claimed in claim 80 wherein the alkali siliconate silylorganosulfonate has the general formula

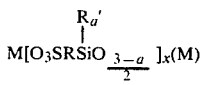

wherein M is a monovalent, divalent or trivalent cation; x has a value of 1 to 3 and equal to the valence of M; R is a hydroxy-substituted divalent group having 3 to 18 carbon atoms and said hydroxy substituent is bonded to a carbon atom vicinal to the carbon atom to which the $-O_3S-$ group is bonded; R' is a monovalent alkyl group having 1 to 8 carbon atoms and, a is an integer of 0 to 2.

96. A composition as claimed in claim 95 wherein the alkali siliconate silylorganosulfonate is

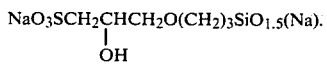

97. A composition as claimed in claim 95 wherein the alkali siliconate silylorganosulfonate is

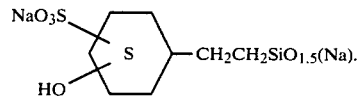

98. A composition as claimed in claim 95 wherein the alkali siliconate silylorganosulfonate is present in the particulate slurry at 0.01 to 7.5 weight percent based on the weight of the particulate in the slurry.

99. A composition as claimed in claim 80 wherein the alkali siliconate silylorganosulfonate has the general formula

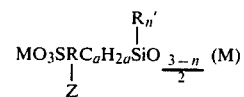

wherein Z is at least one of a hydrogen atom, a monovalent alkyl group having 1 to 8 carbon atoms, a monovalent aryl group or alkyl substituted aryl group having up to 10 carbon atoms in the aryl group and 1 to 8 carbon atoms in the alkyl group, or a monovalent group having a formula selected from the group consisting of

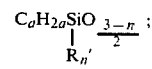

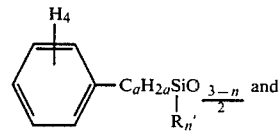

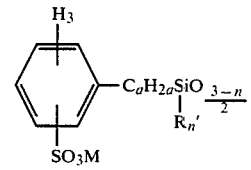

wherein said groups are connected to R through a carbon to carbon linkage, R is a divalent or trivalent aryl group containing up to and including 10 carbon atoms, R' is an alkyl group, a is an integer of from 2 to 4, n is an integer of from 0 to 2 and, M is a monovalent, divalent or trivalent cation.

100. A composition as claimed in claim 99 wherein the alkali siliconate silylorganosulfonate is

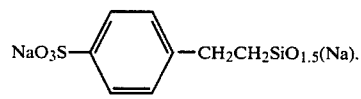

101. A composition as claimed in claim 99 wherein the alkali siliconate silylorganosulfonate is

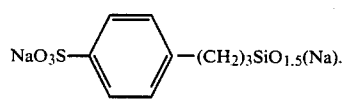

102. A composition as claimed in claim 99 wherein the alkali siliconate silylorganosulfonate is present in the particulate slurry at 0.01 to 7.5 weight percent based on the weight of the particulate in the slurry.

103. A composition as claimed in claim 46 wherein the organosilicon compound is an alkali siliconate silylorganocarboxylate.

104. A composition as claimed in claim 103 wherein the alkali siliconate silylorganocarboxylate has the general formula

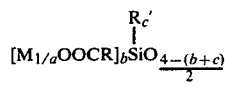

wherein M is selected from a group consisting essentially of alkaline metal cations selected from a group consisting of sodium, potassium, lithium, and rubidium, and tetraorganoammonium cations; a is the valence of the cation represented by M and b is an integer having a value of at least one, R is selected from the group consisting of unsubstituted divalent hydrocarbon groups, $M_{1/a}OCC$ and substituted divalent hydrocarbon groups, each $M_{1/a}OOC$ group is connected to the silicon atom through at least 2 carbon atoms of the group represented by R; R' is a monovalent hydrocarbon group; b is an integer having a value of 1 to 3 inclusive; c is an integer having a value of 0 to 2 inclusive and, b+c has a value of from 1 to 3 inclusive.

105. A composition as claimed in claim 104 wherein the alkali siliconate silylorganocarboxylate is $KOOCCH_2CH_2SiO_{1.5}(K)$.

106. A composition as claimed in claim 104 wherein the alkali siliconate silylorganocarboxylate is $KOOCCH_2CH_2Si(CH_3)O(K)$.

107. A composition as claimed in claim 104 wherein the alkali siliconate silylorganocarboxylate is $KOOC(CH_2)_3SiO_{1.5}(K)$.

108. A composition as claimed in claim 104 wherein the alkali siliconate silylorganocarboxylate is $NaOOC(CH_2)_2Si(CH_3)O(Na)$.

109. A composition as claimed in claim 104 wherein the alkali siliconate silylorganocarboxylate is present in the Particulate slurry at 0.01 to 7.5 weight percent based on the weight of the particulate in the slurry.

110. A composition of matter as claimed in claim 103 wherein the alkali siliconate silylorganocarboxylate is selected from a group consisting essentially of (I) a siliconate having the general formula

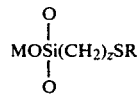

and (II) a siliconate having the general formula

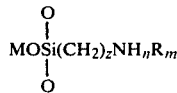

wherein in both formulas, M is selected from a group consisting essentially of (i) alkali metal cations and (ii) tetraorganoammonium cations and z has a value of 2 or 3, wherein in formula (I), R is selected from a group consisting essentially of —CH$_2$COOM, —CH$_2$CH$_2$COOM,

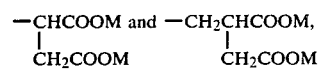

wherein in formula (II), n has a value of 0 or 1; M has a value of 1 or 2, the sum of n+m is 2 and each R is independently selected from a group consisting essentially of —CH$_2$COOM, —CH$_2$CH$_2$COOM,

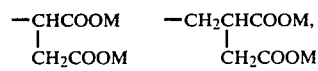

and —(CH$_2$)$_2$N(CH$_2$COOM)$_2$ when n is 0 and m is 2, and R is selected from a group consisting essentially of

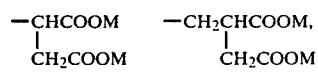

and $(CH_2)_zNH_pR_q'$ when n is 1 and m is 1, p has a value of 0 or 1, q has a value of 1 or 2 and the sum of p+q is 2 wherein R' is selected from a group consisting of

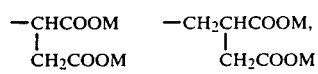

when p is 1 and q is 1 and R' is selected from a group consisting of —CH$_2$COOM, —CH$_2$CH$_2$COOM,

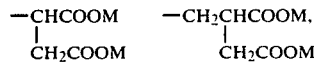

when p is 0 and q is 2, wherein M and z have the same meaning as set forth above.

111. A composition of matter as claimed in claim 71 wherein component (I) is selected from a group consisting of titanium dioxide, zinc oxide, iron oxide, cobalt modified iron oxide, zinc sulfide, antimony oxide, chromium oxides, basic carbonate white lead, basic sulfate white lead, barium sulfate, calcium carbonate, silica dioxide, magnesium silicate, aluminum silicate, mica and mixtures thereof.

112. A method of uniformly dispersing a particulate material in an aqueous slurry which method comprises
(I) contacting an aqueous particulate slurry with an organosilicon compound selected from the group consisting of (i) anionic siliconates of silylorganophosphonates; (ii) anionic siliconates of silylorganosulfonates; and (iii) anionic siliconates of silylorganocarboxylates;
(II) intimately mixing the organosilicon compound and the slurry, whereby a slurry with a more uniform dispersion of particulate material than was extant before the organosilicon compound was contacted with the particulate slurry, is obtained.

* * * * *